United States Patent [19]
Nicolaides

[11] 3,820,150
[45] June 25, 1974

[54] TEMPERATURE INSENSITIVE DOPED AMORPHOUS THIN FILM SWITCHING AND MEMORY DEVICE

[75] Inventor: Ruth Nicolaides, Andover, N.J.

[73] Assignee: The United States of America as represented by the Secretary of the Army, Washington, D.C.

[22] Filed: Aug. 1, 1972

[21] Appl. No.: 276,997

[52] U.S. Cl. .......................... 357/2, 357/74, 357/63, 317/234 R
[51] Int. Cl. ........................... H01l 3/16, H01c 7/10
[58] Field of Search .................. 317/234 V, 235 AQ

[56] References Cited

UNITED STATES PATENTS

| | | | |
|---|---|---|---|
| 3,271,591 | 9/1966 | Oyshinsky | 317/234 G |
| 3,395,445 | 8/1968 | Ovshinsky | 317/234 V |
| 3,657,006 | 4/1972 | Fisher et al. | 317/234 G |
| 3,676,569 | 7/1972 | Thompson | 317/234 G |

OTHER PUBLICATIONS

Kolomiets et al. ". . . Impurity in . . . Vitreous As $_2$SeTe$_2$," Fizika Tverdogo Tela, Vol. 2, No. 1, pp. 174–176, Jan. 1960.
(APS translation-"Soviet Physics—Solid State").
Pearson et al., ". . . Semiconducting Glass Diodes," Applied Phys. Lett., 14, 280; Vol. 14, No. 9, pp. 280–282, May 1969.
Maruno et al., "Diffusion of Metals . . . ," Japan. J. Appl. Phys., Vol. 10, p. 653, 1971.

*Primary Examiner*—Rudolph V. Rolinec
*Assistant Examiner*—William D. Larkin
*Attorney, Agent, or Firm*—Edward J. Kelly; Herbert Berl; A. Victor Erkkila

[57] ABSTRACT

This invention relates to a semi-conductor switching and memory device having a threshold or breakdown voltage which is relatively insensitive to environmental temperatures which range from approximately −35° to 130°C. and nuclear radiation after exposure to $1.3 \times 10^{17}$ n/cm. In addition to the temperature insensitivity and radiation hardness characteristics of the present invention, the device exhibits a symmetrical positive and negative voltage limiting or voltage regulating phenomena in its "off" state current-voltage characteristic and also exhibits in its memory mode a very short setting and resetting time. The present device has a doped chalcogenide amorphous thin film material positioned adjacent two electrodes. The semi-conductor is deposited on an insulating substrate which is fixedly held in a sealed, nitrogen containing "flat pack" type ceramic container. The electrodes of the semi-conductor are electrically coupled to hermetically sealed electrical terminal feed-throughs of a container.

14 Claims, 6 Drawing Figures

TEMPERATURE INSENSITIVE DOPED AMORPHOUS THIN FILM SWITCHING AND MEMORY DEVICE

GOVERNMENTAL INTEREST

The invention described herein may be manufactured, used and licensed by or for the Government for governmental purposes without the payment to me of any royalty thereon.

BACKGROUND OF THE INVENTION

Various means have been used in prior art to manufacture semi-conductor thin film switching and memory devices. These prior art devices have limited utility because of their changing operating parameters as a function of temperature. Prior art crystaline type semi-conductors not only exhibited temperature dependence and deterioration as a result of exposure to high nuclear fields, but were also difficult to manufacture with predictable operating characteristics. The difficulty in producing devices having reproducible operating characteristics caused increased cost and reduced reliability. Prior art amorphous semi-conductor switching and memory devices using chalcogenide materials partially solved this problem because of their relatively simple construction, cheap method of preparation, their compatibility with integrated circuit techniques, and their ability to resist degradation after exposure to high nuclear fields. However, prior art amorphous chalcogenide semi-conductors, just like the crystaline semi-conductors, had limited usefulness where the device was required to be subjected to environmental temperature changes varying from −35°C to +135°C. Under such conditions the aforementioned prior art devices' breakdown or threshold voltage varied greatly within this temperature range. Prior art memory arrays, which are set and reset by circuits delivering a specific voltage, would often fail to function properly because of the shift in operating parameters as a function of temperature. To overcome these undesirable characteristics, prior art amorphous thin film semi-conductor devices required either temperature regulation of the ambient environment or temperature compensating circuitry to adjust the supply voltage in accordance with the changing breakdown voltage temperature coefficient. However, in many applications having severe space and weight limitations, such as found in a missile or a projectile, the aforementioned means for temperature regulation is impossible and/or impractical because of the excessive cost and bulkiness of the accessory equipment. These negative factors help to defeat or reduce the advantage gained in using the cheaper, smaller sized prior art amorphous semi-conductor devices.

SUMMARY OF THE INVENTION

The present invention relates to a new and improved doped amorphous chalcogenide semi-conductor which maintains its threshold or breakdown voltage within approximately a 5 percent range over a temperature range of −35° to +130°C. The present device is prepared by evaporating, sputtering or diffusing a mixture of pre-melted chalcogenide materials, such as $As_2Se_2Te$ or $As_2SeTe_2$, with a metal, such as an aluminum or silver dopant. The aforementioned chalcongenide material and dopants may be either co-deposited or singly deposited from a predoped source. The doped chalcogenide material is deposited on an electrical insulating substrate such as glass, aluminum oxide, or other material having good dielectric strength and then encapsulated in a suitable container having connecting feedthroughs therein.

One of the objects of this invention is to provide a doped amorphous semi-conductor switching and memory device whose threshold or breakdown voltage is stable within 5 percent over an ambient temperature range of −35° to +130°C.

Another object of this invention is to improve the self life storage properties of doped amorphous chalcogenide thin film semi-conductor switching devices.

Another object of this invention is to provide a temperature insensitive doped amorphous chalcogenide thin film semi-conductor device which has a voltage limiting, exponential, hysteresis type response in its "off" state current-voltage characteristic.

Another object of this invention is to provide an insensitive doped amorphous chalcogenide thin film semi-conductor whose current-voltage response curve is symmetrical for both positive and negative applied voltages.

Another object of this invention is to provide a temperature insensitive doped amorphous chalcogenide thin film semi-conductor device which can be produced by co-evaporation, co-sputtering or diffusion.

Another object of this invention is to provide a temperature insensitive doped amorphous chalcogenide semi-conductor thin film device which upon reaching a threshold or breakdown voltage in the "off" state condition shifts in nanoseconds into a low voltage, high current "on" state condition exhibiting a linear current-voltage response until such time that the current is lowered to a holding current point at which time the device returns to the "off," high resistive state.

Another object of this invention is to provide a doped amorphous semiconductor which is relatively insensitive to temperatures varying from −35° to +135°C and also insensitive to nuclear radiations up to $10^{17}$n/cm2.

Another object of this invention is to provide an amorphous semi-conductor device whose setting time for the "on" state condition is between 20 and 50 microseconds and whose resetting time is approximately 0.5 microseconds.

For a better understanding of the present invention, together with other and further objects thereof, reference is made to the following description taken in connection with the accompanying drawings.

BRIEF DESCRIPTION OF THE DRAWINGS

Throughout the following description like reference numerals are used to denote like parts of the drawing.

DESCRIPTION OF THE PREFERRED EMBODIMENTS

Figure 1:
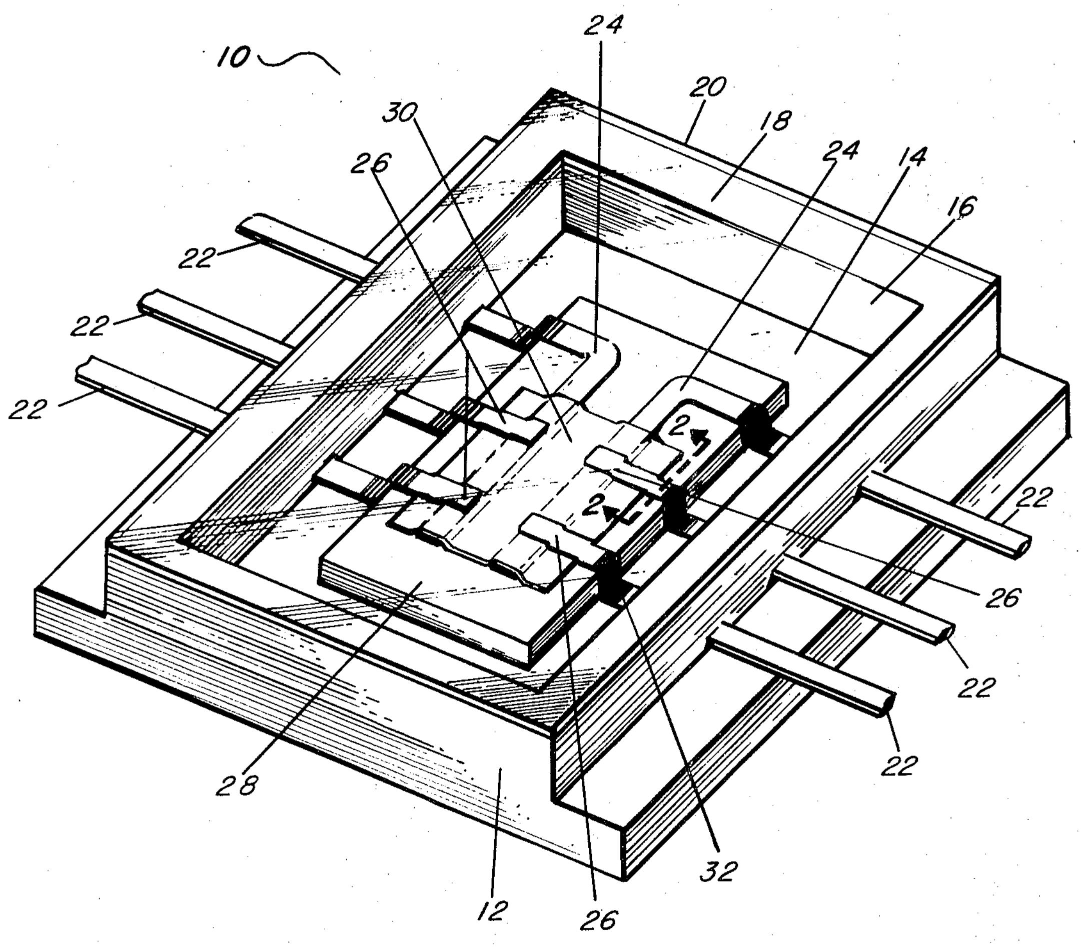
FIG. 1 is an isometric view of one embodiment of the invention showing four temperature insensitive amorphous thin film devices encapsulated in a single "flat pack" or ceramic container having hermetically sealed metal feedthrough leads protruding therefrom.
Figure 2:
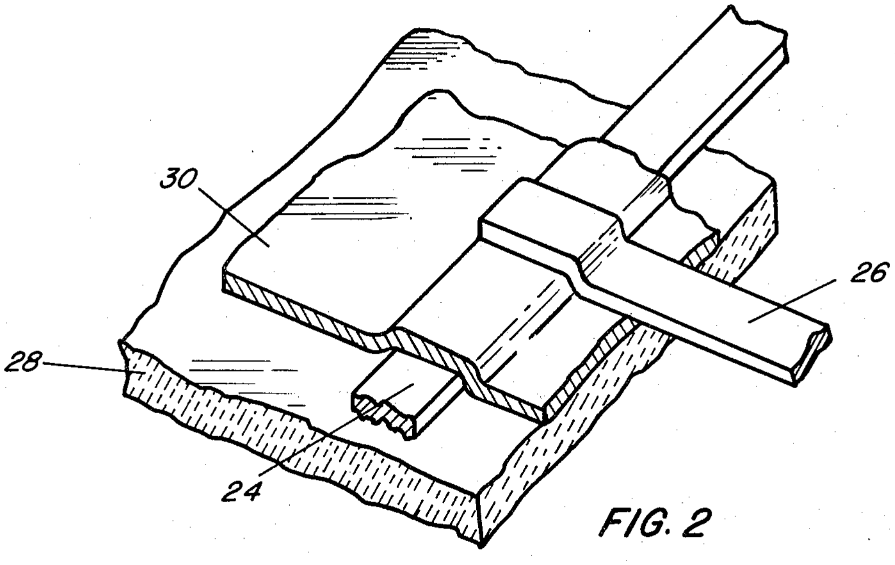
FIG. 2 is an enlarged, partial cross-sectional and isometric view taken along line 2—2 as illustrated in FIG. 1.

Referring now to FIG. 1, the doped amorphous chalcogenide thin film semi-conductor assembly 10 has a ceramic flat pack bottom 12, a flat pack bottom internal square recess 14 surrounded by an integral rectangular shaped raised wall 16 which has a flat rim surface 18 to which a cover glass 20 has been sealed. Flat pack feed-through conductor leads 22 hermitically pass through wall 16 and are first electrically connected to common bottom electrodes 24 and secondly connected to the top electrodes 26. The semi-conductor device is prepared by flash evaporating, sputtering or diffusing upon an insulating material 28 such as glass, alumina, silicon oxide on silicon, or other ceramic material, a mixture of premelted $As_2$ $Se_2$ and Te and the dopant Al or Ag, where it is desired to produce a switch device, and $As_2SeTe_2$ with the Al or Ag dopant, where it is desired to produce a device having memory characteristics. The thickness of the doped amorphous chalcogenide film 30 is 0.8 – 1.8 $\mu$ m for memory devices and 18 $\mu$ m for switching devices. Where aluminum is the dopant of the mixture 0.3 to 0.4 percent by weight is used. Where silver is the dopant 0.3 to 0.5 percent by weight is used. In FIGS. 1 and 2 the common bottom electrodes 24 and the top electrodes 26 are aluminum strips evaporated perpendicular to each other so that a three layer or sandwich type device of approximately 0.25 $mm^2$ area is formed in the overlap area having the doped amorphous chalcogenide film 30 intermediate the aluminum electrodes 24 and 26. After the aforementioned sandwich is made on substrate 28, the latter is affixed to the flat pack bottom 12 in recess 14 and leads 32 are ultrasonically welded to leads 22 and to the bottom and top aluminum electrodes 24 and 26 respectively. The substrate assembly is sealed in the ceramic flat pack by the cover glass 20 so that there is a residual dry inert atmosphere therein.

FIG. 2 shows in an enlarged cross-sectional and isometric view how the common bottom electrode 24 is first deposited upon the substrate 28 then covered with the doped amorphous chalcogenide thin film 30. The second top electrode 26 is then deposited on top of the amorphous thin film 30 in a direction perpendicular to the bottom electrode 24 so that a semi-conductor device of approximately $1\times10^{-4}$ $mm^2$ to 1 $mm^2$ is formed.

Figure 3:
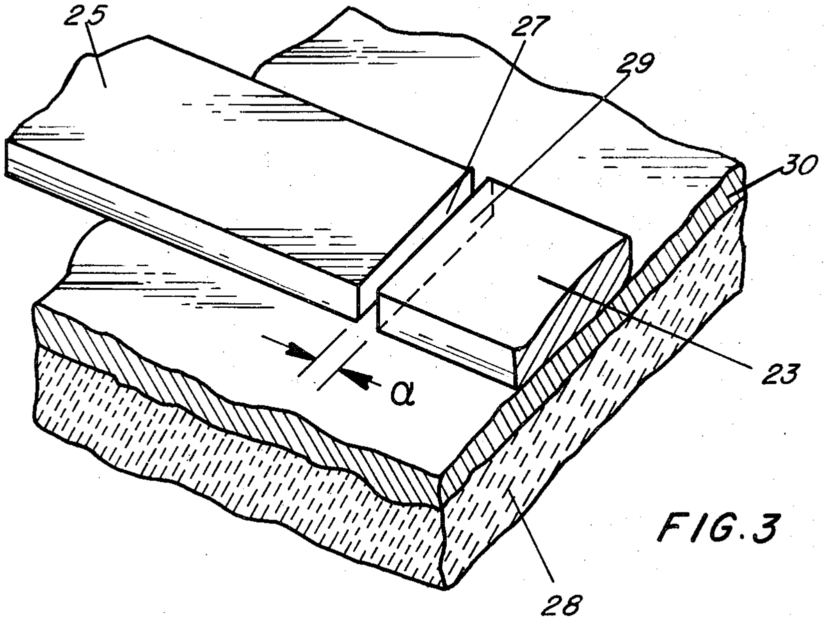
FIG. 3 is an enlarged partial cross-sectional view of an alternate embodiment of the semi-conductor device showing the co-planar construction of the electrodes in close proximity to each other and adjacent to the doped amorphous film.

FIG. 3 shows the co-planar electrodes 23 and 25 respectively deposited upon the doped amorphous chalcogenide thin film 30 which has been deposited upon the insulating substrate 28. In this embodiment of the invention the distance between the parallel spaced coplanar aluminum electrode end surfaces 27 and 29 should be approximately 1–5 microns in order to keep the breakdown voltage approximately less than 200 volts. The assembly as shown in FIG. 3 is retained within a flat pack container in a similar manner as aforedescribed for the three layer embodiment shown in FIG. 1.

Figure 4:
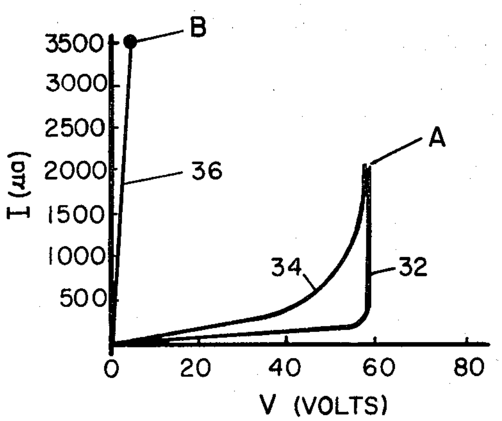
FIG. 4 illustrates a typical current-voltage response curve of an aluminum doped memory device taken while in the "off" state and in the "on" state.

Referring now to FIG. 4 a plot of current versus voltage, for a memory device, is shown in the "off" state condition by curves 32 and 34. The current versus voltage characteristic of the device for its "on" state, condition is shown by curve 36. The plots for both the "on" state and "off" state conditions were made using a rectified pulsating D. C. 60 cycle supply voltage monitoring current and voltage of the device by using a Curve Tracer instrument, Model No. 576 manufactured by Tektronix, Inc. of Beaverton, Ore. The current for both of these modes of operation is plotted on the ordinate at 500 $\mu$ amperes per division and the voltage on the abscissa at 10 volts per division. The curves shown in FIG. 4 are for positively applied voltage. A duplicate current voltage characteristic for the device would exist in the negative quadrant for negatively applied voltages but are not shown. Curve 32 has two distinct, symmetrical non-linear regions for increasing supply voltage separated by a sharp knee. The high voltage region of curve 32 shows a large slope giving the device in this mode of operation a voltage limiting behavior. The upper or return part of the "off" state current-voltage curve 34 is a hysteresis loop showing an exponential current-voltage dependence. Applying a voltage close to the breakdown voltage for approximately 10 seconds causes the lower half of the hysteresis loop to approach the upper half of the loop. During this process the curve knee moves toward lower voltage. This same movement of the curve knee is also observed with increasing ambient temperature. The curves show that the device resistance well below the knee voltage does not change radically with increasing voltage. The "off" state resistance near 25 volts at room temperature is approximately 200,000 ohms for an area of 0.25 $mm^2$ whereas the "on" state resistance is only approximately 45 ohms. The "on" state current voltage characteristic shown by curve 36 is reached when the supply voltage exceeds the breakdown or threshold voltage ($V_{BR}$) at point A, at which time the device current-voltage characteristic jumps to point B on curve 36. Point B is limited in amplitude by the supply voltage, external load resistance of the circuit and the device's own internal impedance. The setting time for the device, that is the time necessary to supply an over voltage to cause the device to switch to the linear mode of operation, as exhibited by curve 36, is 20 to 50 microseconds depending upon the amount of supply overvoltage. The resetting time, that is the duration of the pulse required to turn the device back into the high resistive state, is in the order of 0.5 microseconds.

Figure 5:
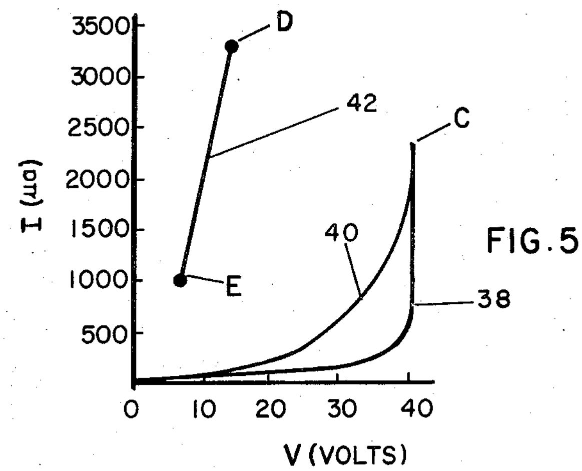
FIG. 5 illustrates a typical current-voltage response curve of a doped amorphous chalcogenide switching device taken while in the "off" state and in the "on" state.

FIG. 5 shows the current-voltage characteristic of a doped amorphous chalcogenide switching device in the "off" state by curves 38 and 40 and in the "on" state by curve 42. The operation of the switching device in the "off" state is such that, similar to the memory device characteristics shown in FIG. 4, it has high resistance at low voltage. Once the device reaches point C, the so-called threshold or breakdown voltage, it switches in several nanoseconds into a low voltage state represented by the linear curve between points D and E. The switching device returns to the so-called holding current point, whereas the memory device, as discussed in FIG. 4, stays in the low resistive state even without any applied voltage. The memory device needs a well defined short current pulse to be set back into the high resistive "off" state.

Figure 6:
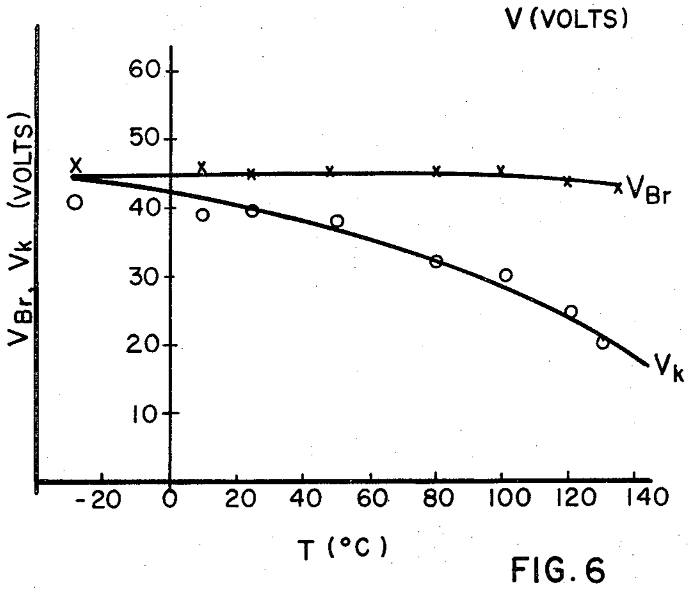
FIG. 6 is a plot of breakdown voltage ($V_{BR}$) and the knee voltage ($V_K$) versus ambient environmental temperature in degrees centigrade of an aluminum doped amorphous chalcogenide thin film semi-conductor device.

The independence of the breakdown voltage ($V_{BR}$) between the temperature range of −30°C to +135°C is illustrated in FIG. 6. The temperature dependence of the knee voltage ($V_k$) over the aforementioned range is also indicated by the lower curve. The threshold or breakdown voltage ($V_{BR}$) remains temperature independent up to the temperature at which the knee voltage goes to zero. Thus the existance of the knee in the "off" state region is closely related to the temperature independence of the breakdown voltage in the device. For temperatures above 135°C the device shows the normal temperature dependence of the breakdown voltage ($V_{BR}$). The "on" state current-voltage curve is also temperature independent between −30° to +135°C.

The foregoing disclosure and drawings are merely illustrative of the principles of this invention and are not to be interpreted in a limiting sense. I wish it to be understood that I do not desire to be limited to the exact detail of construction shown and described for obvious modifications will occur to a person skilled in the art.

Having thus fully described the invention, what is claimed as new and desired to be secured by Letters Patent of the United States is:

1. A temperature insensitive, and nuclear radiation resistant switching device which comprises:
- a semi-conductor means having a doped amorphous chalcogenide layer adjacent a pair of oppositely disposed electrodes, the doping of said layer being sufficient to render said device substantially insensitive to temperature in the range of −35°C to +135°C;
- an electrically insulating substrate for supporting thereon said semiconductor means;
- a hermetically sealed container having a recess for holding said substrate therein, a plurality of hermetically sealed feed-through leads protruding into said recess and exiting therefrom through the container walls for providing electrical connection to said semi-conductor means, a cover plate for hermetically sealing said recess, an inert gas atmosphere retained within said container recess by said cover plate for reducing the shifting of the operational characteristics of said semi-conductor means; and
- means for electrically connecting said electrodes to said feed-through leads.

2. A device as recited in claim 1 wherein said pair of electrodes comprises:
- an elongated bottom electrode deposited upon said substrate; and
- an elongated top electrode deposited upon said chalcogenide layer so that its longitudinal axis lies in a plane perpendicular to the longitudinal axis of said bottom electrode, thereby forming with said chalcogenide layer an operational area ranging from $1 \times 10^{-4}$ mm² to 1 mm².

3. A device as recited in claim 1 wherein said electrodes further include:
- a first electrode immediately adjacent said semiconductor means;
- a second electrode co-planar with said first electrode and adjacent said semi-conductor means having its end separated from said first electrode end by a distance of 1–5 microns.

4. A device as recited in claim 3 wherein the doped amorphous chalcogenide layer comprises a mixture of premelted $As_2Se_2Te$ and an aluminum dopant of 0.3 to 0.4 percent by weight.

5. A device as recited in claim 4 wherein the doped amorphous chalcogenide layer comprises a mixture of premelted $As_2Se_2Te$ and a silver dopant of 0.3 to 0.5 percent by weight.

6. A device as recited in claim 5 wherein said substrate is a material selected from the group consisting of glass, aluminum oxide, and silicon oxide on silicon.

7. A temperature insensitive and nuclear radiation resistant memory device having short setting and resetting time which comprises:
- a semi-conductor means having a doped amorphous chalcogenide layer adjacent a pair of oppositely disposed electrodes, the doping of said layer being sufficient to render said device substantially insensitive to temperature in the range of −35°C to +135°C;
- an electrically insulating substrate for supporting thereon said semiconductor means;
- a hermetically sealed container having a recess for holding said substrate therein, a plurality of hermetically sealed feed-through leads protruding into said recess and exiting therefrom through the container walls for providing electrical connection to said semi-conductor means, a cover plate for hermetically sealing said recess, an inert gas atmosphere retained within said container recess by said cover plate for reducing the shifting of the operational characteristics of said semi-conductor means; and
- means for electrically connecting said electrodes to said feed-through leads.

8. A device as recited in claim 7 wherein said pair of electrodes comprises:
- an elongated bottom electrode deposited upon said substrate; and
- an elongated top electrode deposited upon said chalcogenide layer so that its longitudinal axis lies in a plane perpendicular to the longitudinal axis of said bottom electrode thereby forming with said chalcogenide layer an operational area ranging from $1 \times 10^{-4}$ mm² to 1 mm².

9. A device as recited in claim 7 wherein said electrodes further include:
- a first electrode immediately adjacent said semiconductor means;
- a second electrode co-planar with said first electrode and adjacent said semi-conductor means having its end separated from said first electrode end by a distance of 1–5 microns.

10. A device as recited in claim 9 wherein the doped amorphous chalcogenide layer comprises a mixture of premelted $As_2SeTe_2$ and an aluminum dopant of 0.3 to 0.4 percent by weight.

11. A device as recited in claim 10 wherein the doped amorphous chalcogenide layer comprises a mixture of premelted $As_2SeTe_2$ and a silver dopant of 0.3 to 0.5 percent by weight.

12. A device as recited in claim 11 wherein said substrate is a material selected from the group consisting of glass, aluminum oxide, and silicon oxide on silicon.

13. A device as recited in claim 1 wherein said layer is resistant to nuclear radiation up to $10^{17}$ neutrons/cm$^2$.

14. A device as recited in claim 7 wherein said layer is resistant to nuclear radiation up to $10^{17}$ neutrons/cm$^2$.

* * * * *